United States Patent
Wold

[11] Patent Number: 5,902,000
[45] Date of Patent: May 11, 1999

[54] VEHICLE BED EXTENDER

[76] Inventor: Richard G. Wold, 1261 Dartmouth Rd., Flossmoor, Ill. 60422

[21] Appl. No.: 08/823,144

[22] Filed: Mar. 25, 1997

[51] Int. Cl.$^6$ .................................................. B62D 33/08
[52] U.S. Cl. ............................................ 296/26; 296/57.1
[58] Field of Search ...................................... 296/26, 57.1

[56] References Cited

U.S. PATENT DOCUMENTS

| | | |
|---|---|---|
| 1,085,670 | 2/1914 | Cronk . |
| 1,280,761 | 10/1918 | Kirkpatrick et al. . |
| 2,214,575 | 9/1940 | Cercownay ............................. 296/26 |
| 2,872,239 | 2/1959 | Bowness et al. ....................... 296/26 |
| 3,132,781 | 5/1964 | Poczatek ............................. 224/42.33 |
| 4,023,850 | 5/1977 | Tillery ................................... 296/26 |
| 4,472,639 | 9/1984 | Bianchi ................................. 296/26 |
| 4,531,773 | 7/1985 | Smith ..................................... 296/26 |
| 4,824,158 | 4/1989 | Peters et al. ......................... 296/37.6 |
| 5,090,335 | 2/1992 | Russell .................................. 108/44 |
| 5,441,324 | 8/1995 | Gold ...................................... 296/26 |
| 5,501,500 | 3/1996 | Cannon ................................. 296/26 |

*Primary Examiner*—Gary C. Hoge
*Attorney, Agent, or Firm*—McDonnell Boehnen Hulbert & Berghoff

[57] ABSTRACT

A vehicle bed extender for attaching to a tailgate. The vehicle bed extender has a rear panel, the inner edge of which is hinged to the outer border of the tailgate. Side panels are provided, the bottom edges of which are hinged to the side border of the tailgate. The outer edges of the side panels are releasably hinged to the outer edge of the rear panel by a single hinge. The side panels have a diagonal hinge which folds inwardly when the rear panel is pushed toward the tailgate.

4 Claims, 6 Drawing Sheets

VEHICLE BED EXTENDER

BACKGROUND OF THE INVENTION

1. Field of the Invention

This invention is in the field of extending the length of beds of trucks and other vehicles.

2. Description of the Prior Art

British Patent No. 1,085,670 to Cronk Feb. 3, 1914—teaches a foldable carrier to be secured to the end of a vehicle in which a platform is hingedly folded down for use and up for nonuse. Straps are used to secure items stored on the platform and to secure a cover over the items to protect them from the elements. The platform apparatus is generally secured to the axle of the vehicle and has spring supports to absorb energy from the bumpy ride of the vehicle.

British Patent No. 1,280,761 to Dobbs Oct. 8, 1918—teaches an add-on carrier for luggage which is to be secured to the back end of any automobile. In its stored position the carrier is relatively flat and stored in an upright position behind the car. The bottom platform support is hinged to the mounting apparatus and can be pulled down and the back end of the carrier is hingedly secured to the bottom platform and can then be raised into position. The side panels are pivoted into place forming a box-like carrier.

U.S. Pat. No. 2,214,575 to Cercownay Sep. 16 1940—teaches an extender to a pickup truck in which an extension of the bed slides out over the opened tailgate and beyond the extension of the tailgate of the truck. A slidable support for this extension moves outwardly under this extension from the bumper and supports the extension.

U.S. Pat. No. 3,132,781 to Poczatek May. 12 1964—teaches a collapsible carrier to be positioned overlie the back bed area of a station wagon. The carrier can be supported by rollers or the like in order to permit ease in sliding the carrier toward the rear of the station wagon for ease in loading and unloading. Moreover, the rear upwardly extending wall of the carrier can be lowered to overlie the tailgate of the station wagon to protect the tailgate while loading and unloading.

U.S. Pat. No. 4,023,850 to Tillery May. 17 1977—teaches an extender for the tailgate of the pickup truck. Basically, an extension is mounted to the top of the tailgate and hinged arms support it to the side walls of the bed. This structure can be readily seen in the FIGS.

U.S. Pat. No. 4,824,158 to Peters Apr. 25 1989—teaches a carrier tray that is slidable from within the bed of the pickup truck outwardly. A support bracket is mounted to the bottom of the bed of the pickup truck in which the bracket carries the carrier tray. Once the carrier tray is inserted into the support bracket, it can be slid into storage position within the bed of the truck and can be slid into storage position within the bed of the truck and can be slid outwardly from the bed with the tailgate in a downward position. The tray can be locked in intermediate positions with the tray extending outwardly from the bed of the truck. The support bracket provides vertical support to the tray with the tray in an extended outward position. With the tray in position overlying the bed of the truck, it provides protection to the bed floor.

U.S. Pat. No. 5,090,335 to Russell Feb. 25 1992—teaches a sliding extension of the bed of the pickup truck. In which the extension in its extended position is supported at one end by the bed and at the other end with legs to the ground. This extender is not for carrying any loads with the vehicle in operation but is a portable work table.

U.S. Pat. No. 5,441,324 to Gold Aug. 15 1995—teaches an extender for a van. The open rear doors act as side walls and fold down sections from each door act as a floor extender. There is no rear wall.

U.S. Pat. No. 5,501,500 to Cannon Mar. 26 1996—teaches for an extender plate to be stored on a pickup truck and then when needed extended outwardly out of the back end of the truck bed. The extender plate in the extended position is supported by a bumper extension structure. There are no rear or side walls to the extender.

SUMMARY OF THE INVENTION

This invention encompasses a bed extender for a vehicle. The bed extender may be constructed on the inner surface of a tailgate in the original manufacture of a vehicle or it may be constructed as a unit attachable to the tailgate of existing vehicles. The bed extender comprises a rear panel that is hinged to the upper border of a tailgate and side panels that are hinged to the side border of the tailgate and releaseably hinged to the ends of the rear panel. The side panels also have a diagonal hinge which permits the side panels to fold inwardly. In the closed position, the side panels are folded under the end panel which covers the inner surface of the tailgate. In operation, the tailgate is opened and the rear panel of the bed extender is raised and as it is raised, the hinged side panels unfold to form side walls of the extender. When the side panels and the rear panel are unhinged from one another, the tailgate is lowered to permit access to the bed. The rear panel and side panels can be built into a vehicle at the point of manufacture or it can be made as an attachable unit by having attachment means on the lower edges of the side walls and rear panel. Generally, the rear panel and side walls are screwed or bolted to the inner surface of the tailgate.

DETAILED DESCRIPTION OF THE INVENTION

The present invention provides for extending the bed and also serves as a tailgate surface protector of a truck or similar vehicle. The bed extender is conveniently stored for infrequent use and provides for normal operation of the tailgate. The details of the present invention is best described in terms of the drawings.

Figure 1:
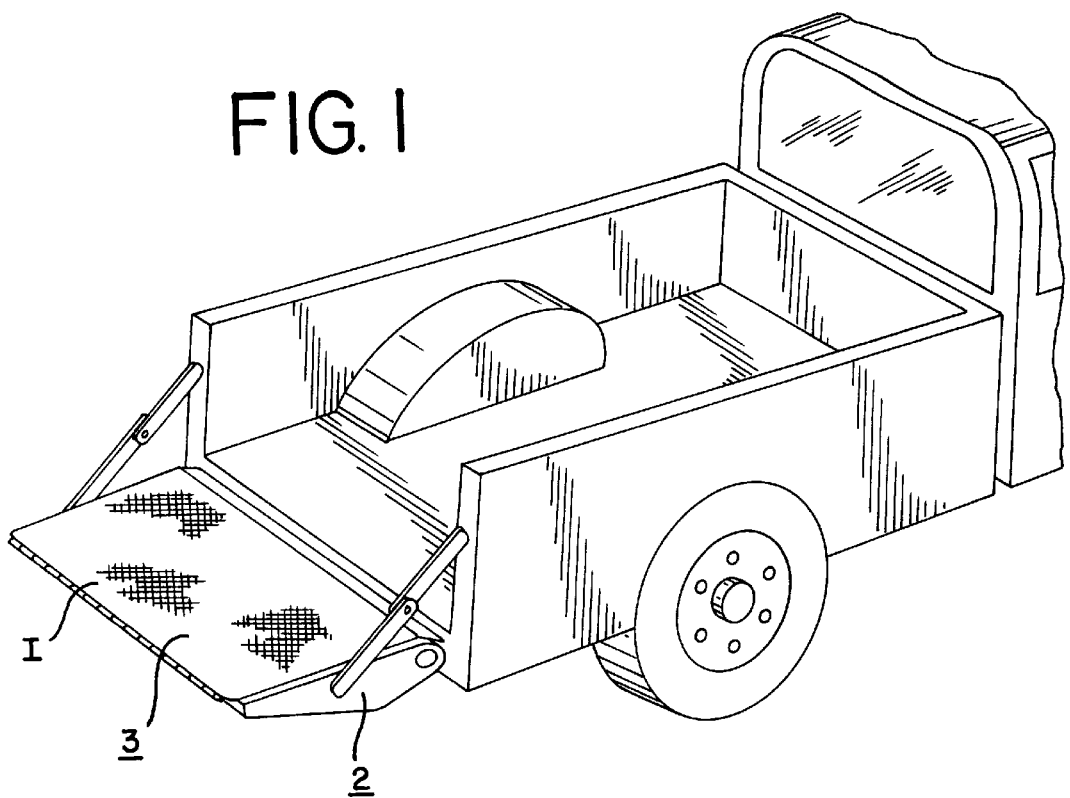
FIG. 1 is a perspective view of the extender in the closed position.
Figure 2:
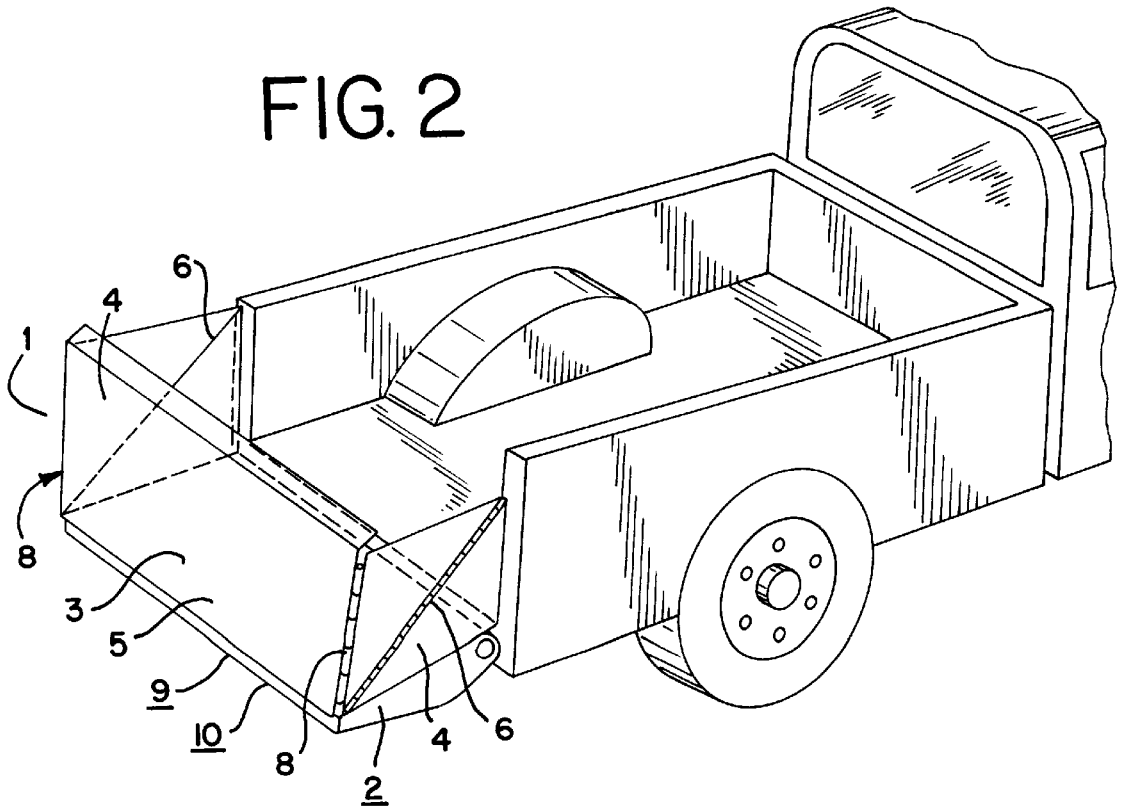
FIG. 2 shows the same perspective view as in Fig. 1 with the bed extender in the open position.

FIG. 1 shows the bed extender 1 attached to the tailgate 2 the outer surface 3 of the bed extender 1 serves as a protector of the tailgate 2. FIG. 2 shows the bed extender 1 in the open position. Side walls 4 have a diagonal spring tension hinge 6 and a releaseable hinge through side hinge 8 to the rear panel 5. The rear panel 5 is hinged through a bottom hinge 9 to the outer border of the tailgate 10. Side walls 4 have mating snaps that secure the outer surface 3 in the closed position.

Figure 3A:
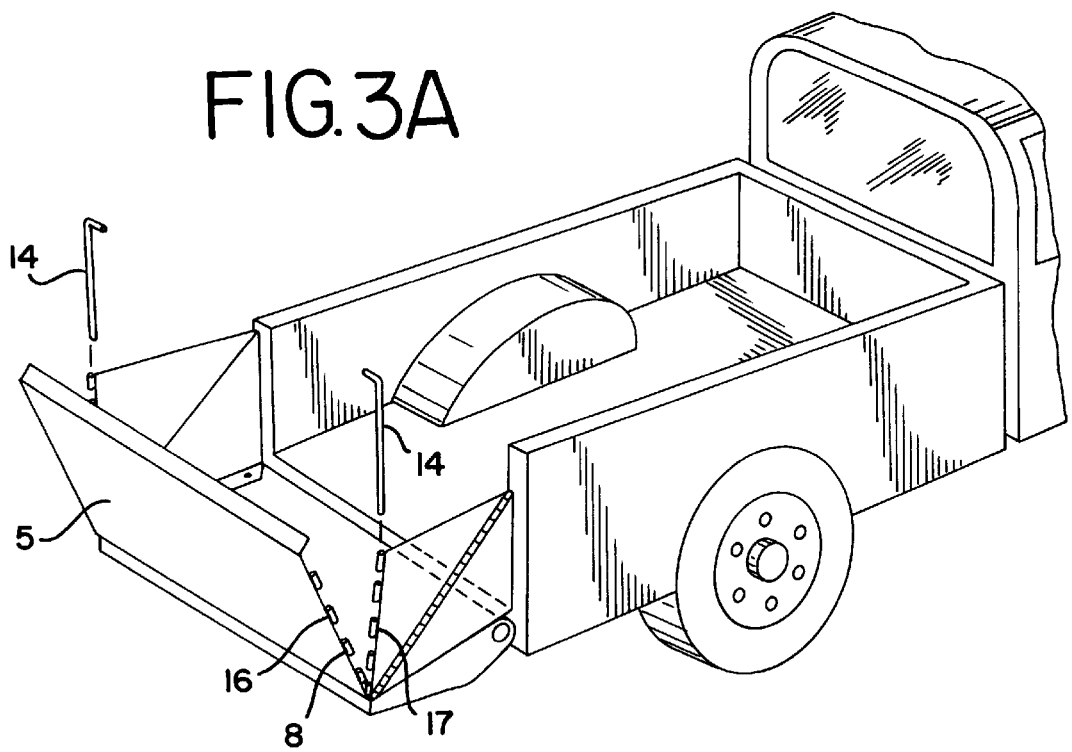
FIG. 3A and 3B illustrates opening of the bed extender panel.
Figure 3B:
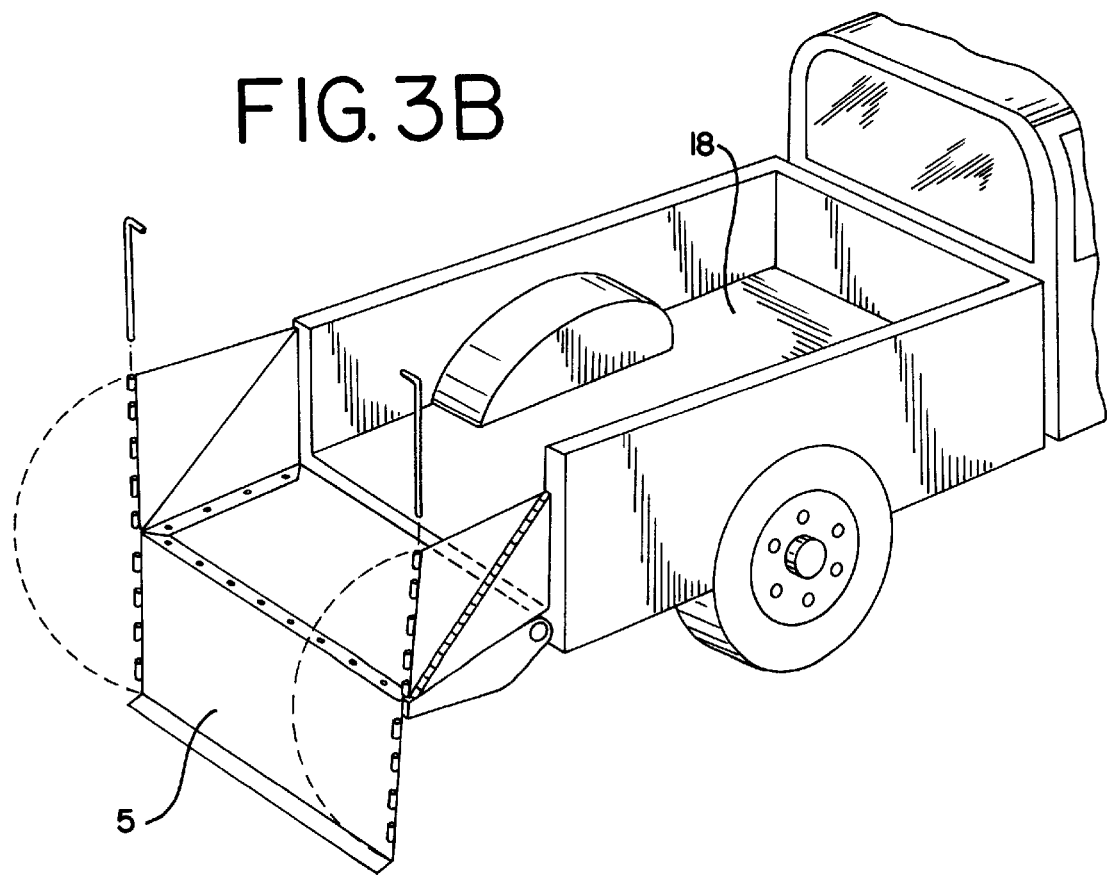

FIG. 3A and 3B illustrate a side hinge 8 in which a pin 14 fits into loops 16 on the rear panel 5 and loops 17 on the side wall 4. Removal of pin 14 permits the rear panel 6 to rotate about the bottom hinge 9 to provide access to the truck bed 18, as seen in FIG. 3B.

Figure 4A:
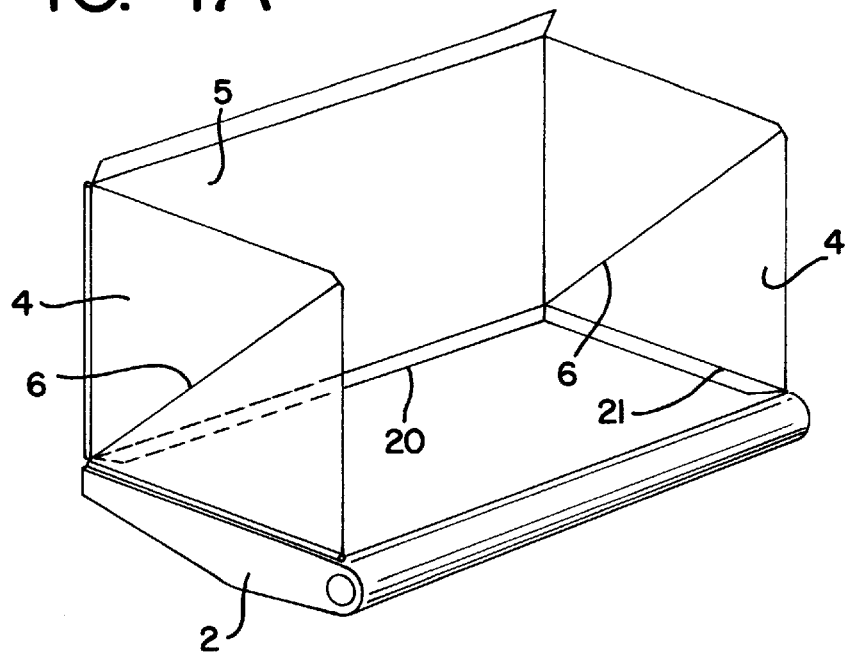
FIG. 4A, 4B and 4C illustrates the closing of the bed extender built into original vehicle.
Figure 4B:
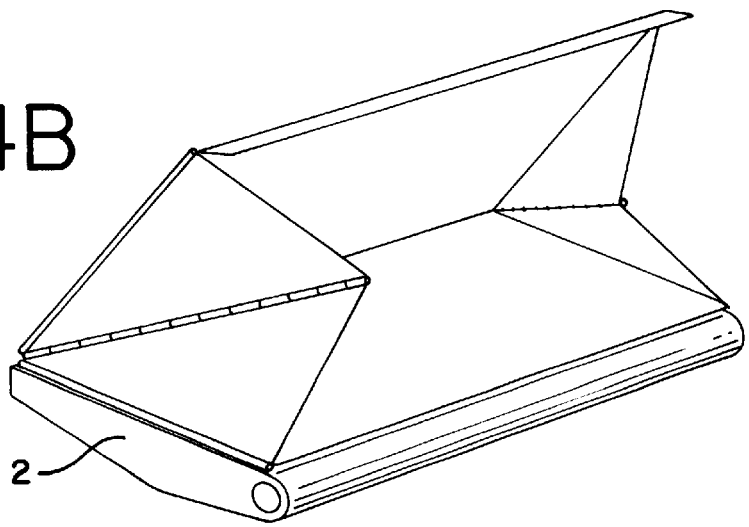
Figure 4C:
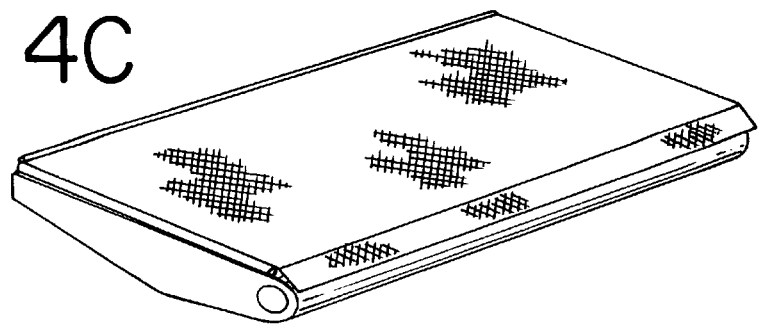

FIGS. 4A, 4B, and 4C illustrate the bed extender built into the tailgate 2. The rear panel 5 is attached to the tailgate 2 along the inner edge 20 of the rear panel and the side walls 4 are attached to tailgate 2 along bottom edge 21. FIG. 4A shows the bed extender in the open position. FIG. 4B shows the side wall 4 closing inwardly along hinge 6 as the rear panel 5 is moved toward the tailgate 2. FIG. 4C shows the bed extender closed and positioned to serve as a tailgate protector.

Figure 5A:
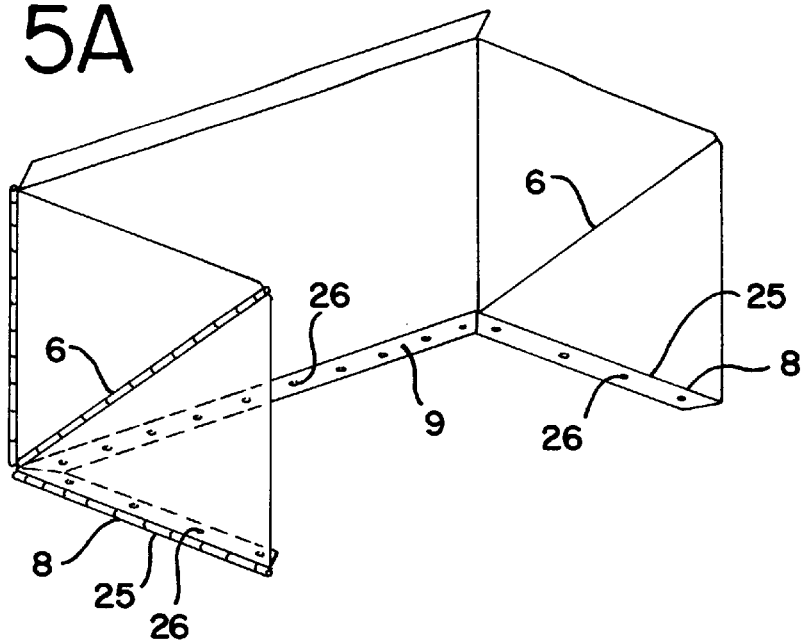
FIG. 5A, 5B and 5C illustrates an attachable bed extender in the open, closing, and closed position.
Figure 5B:
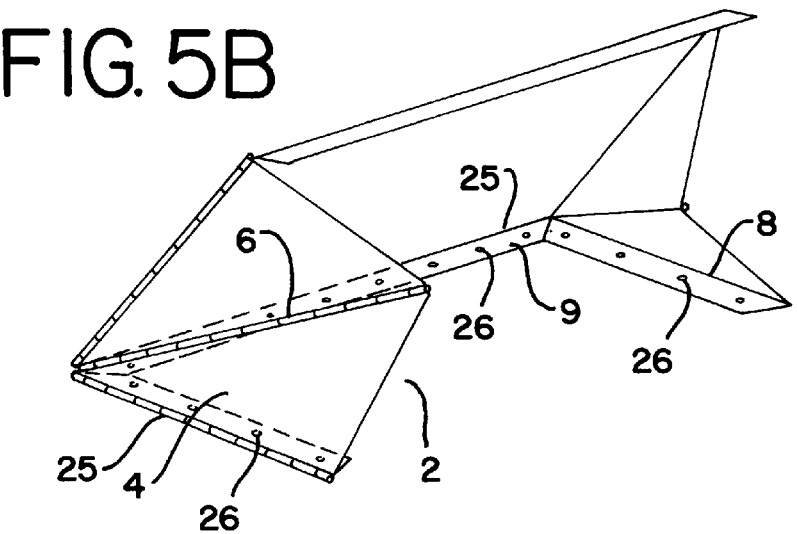
Figure 5C:
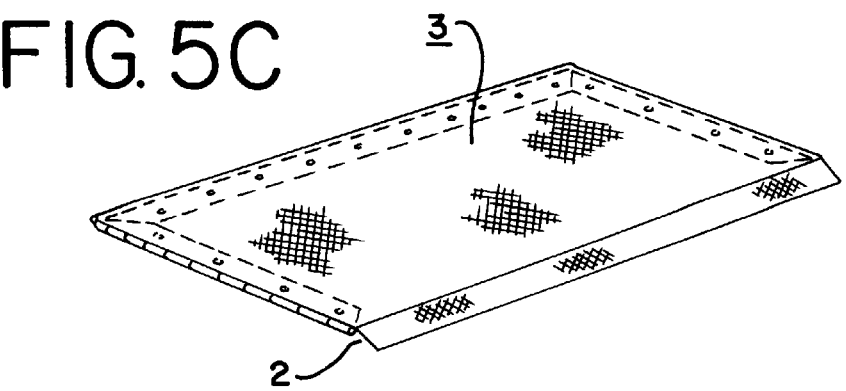

FIGS. 5A, 5B, and 5C illustrates an attachable bed extender assembly which is attachable to existing vehicles. In this embodiment, the hinge members 8 and 9 have a fastening plate 25 with holes 26 for attaching the assembly to the tailgate 2 by screws or bolts as shown in Fig. 5A. FIG. 5B shows the attachable assembly closing. The side walls 4 close inwardly along hinge 6 as the rear panel 5 is moved toward tailgate 2.

Figure 6:
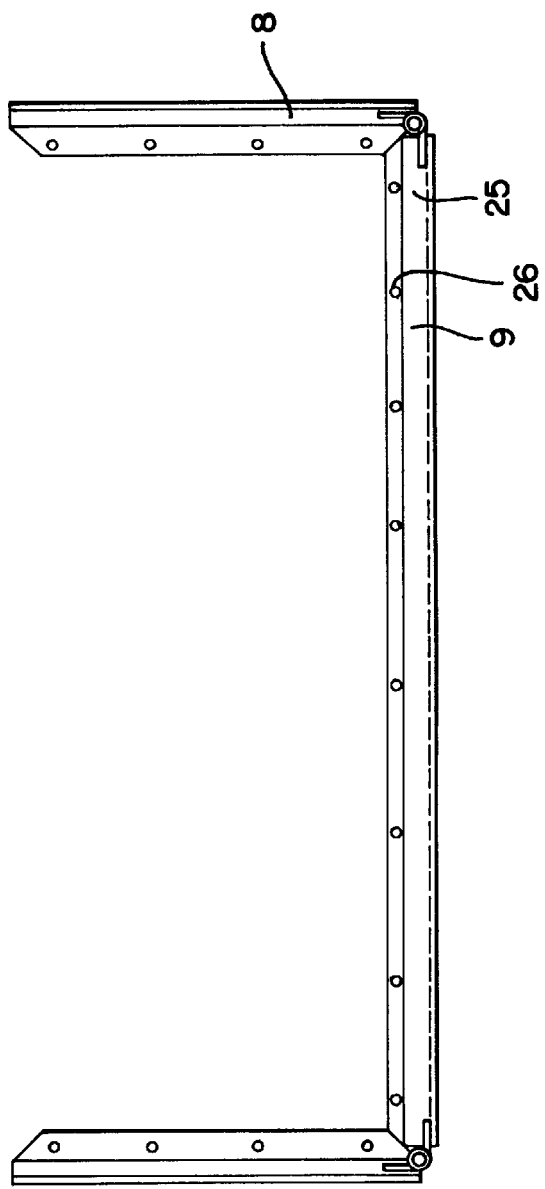
FIG. 6 is a top plan view of the bed extender.

FIG. 6 shows the attachable end extender assembly in the closed position with panel 3 serving as a protector of the tailgate 2. Hinge members 8 and 9 are shown with fastening plate 25 with holes 26.

Figure 7:
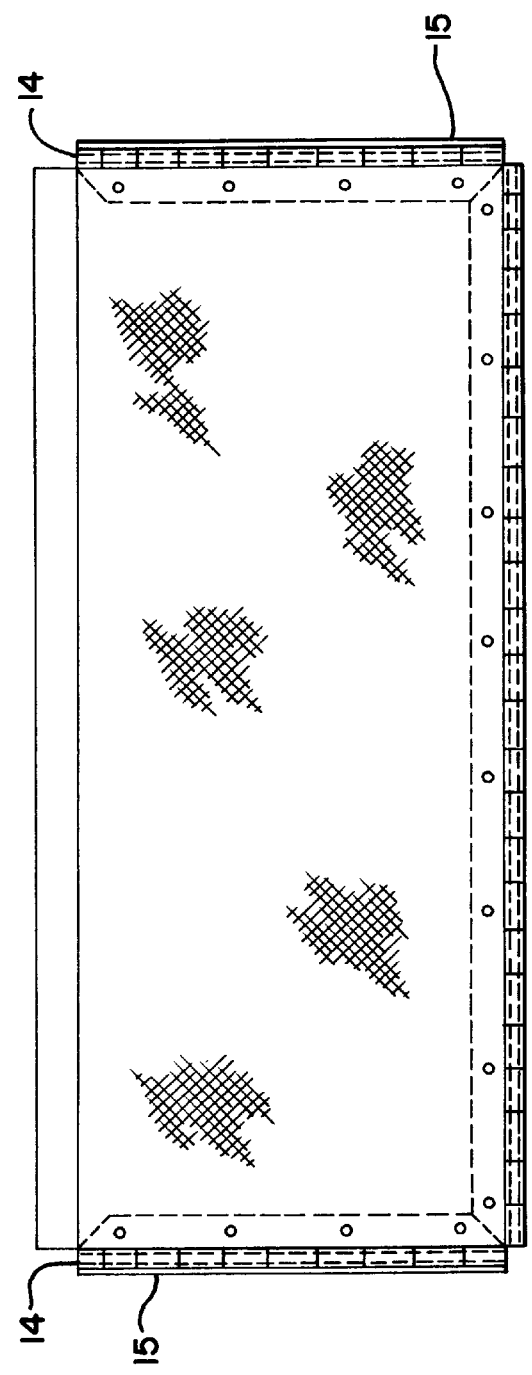
FIG. 7 is a front view of the bed extender.

FIG. 7 shows side hinge 8 and removable pin 14 and bottom hinge 9.

Figure 8:
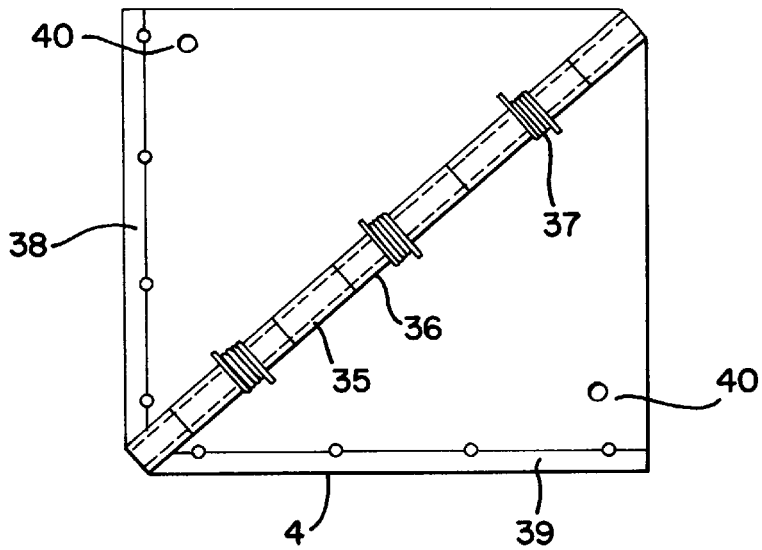
FIG. 8 is a plan view of the side wall with a spring tension hinge.
Figure 9:
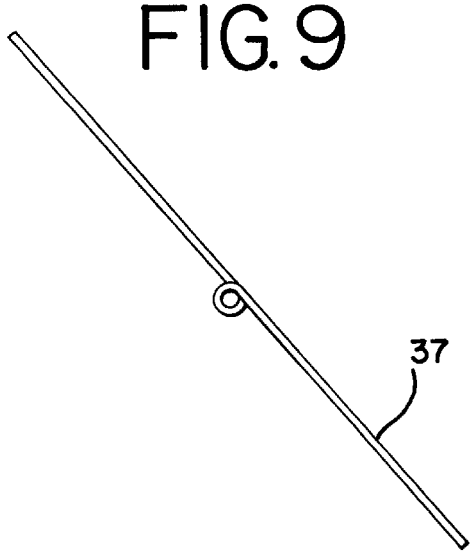
FIG. 9 is a plan view of the side wall hinge.

FIG. 8 shows side panel 4 with diagonal hinge 6 and illustrates hinge loops 35 and 36 and spring tension member 37 which permits side panel plate 38 and 39 to collapse along the hinge line but biases the side wall in the open position. FIG. 8 also shows mating snaps 40 which secure the side panels 4 when they are in the closed position. FIG. 9 shows an auxiliary view of side panel 4.

Figure 10:
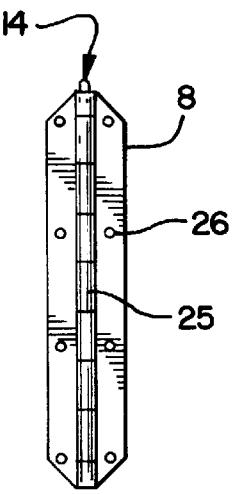
FIG. 10 is a plan view of the rear panel side and side bottom hinge.

FIG. 10 shows the side hinge 8 with plate 25 and holes 26. Pin 14 is removable.

Figure 11:
FIG. 11 is a plan view of the rear panel bottom hinge.

FIG. 11 shows the bottom hinge 9 with plate 25 and holes 26.

The component parts to the bed extender of the present invention is generally fabricated out of steel sheet used in making automobile panels but alternately can be made from a durable fiberglass, plastic material, or aluminum.

The components part are representative embodiments of the present invention and are intended to illustrate the present invention and not to limit it in spirit or scope.

What is claimed is:

1. A vehicle bed extender for attaching to a tailgate with an outer border and side borders comprising an elongated rear panel with an inner, outer and side edges and two side panels with top, bottom and inner and outer edges wherein the inner edge of the rear panel is hinged to the outer border of the tailgate and the bottom edge of the side panels are hinged to the side border of the tailgate;

and wherein the outer edge of the side panels are releasably hinged to the outer edge of the rear panel by a side hinge;

and wherein the side panels have a diagonal hinge which folds inwardly when the rear panel is pushed toward the tailgate, the inner edge of the rear panel and the bottom edge of the side panels have a means for attaching the side panel and rear panel to the tailgate.

2. The bed extender of claim 1 wherein the rear panels and side panels are attached to the tailgate during the manufacturing process.

3. The extender bed of claims 1 or 2 wherein the diagonal hinge is spring biased to be in the open position.

4. The extender bed of claims 1 or 2 wherein the releasable side hinge comprises interfitting loops on the outer edge of the side panel and the outer edge of the rear panel and wherein a removable pin fits into the loops to form a hinge.

* * * * *